United States Patent Office 3,389,426
Patented June 25, 1968

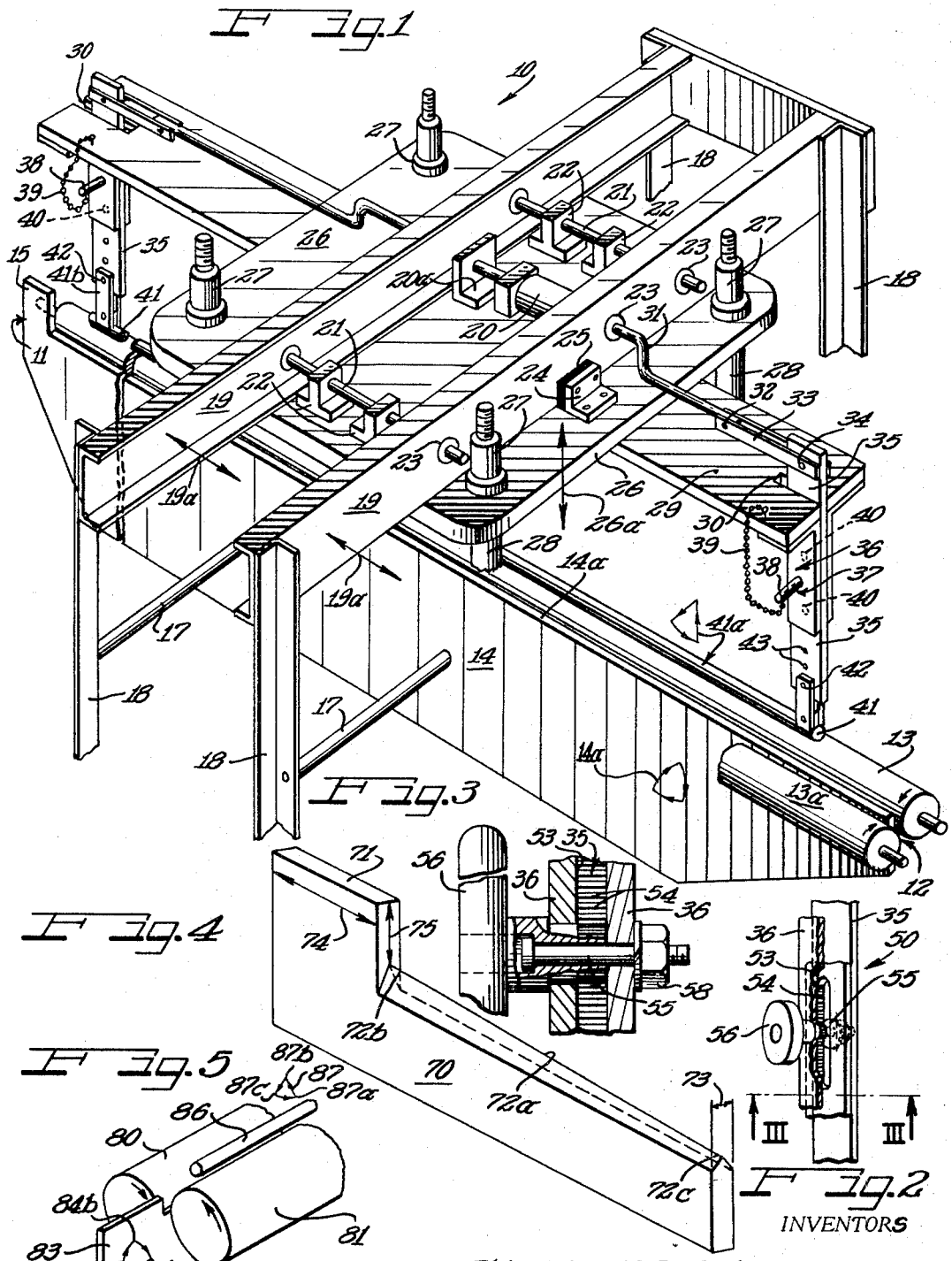

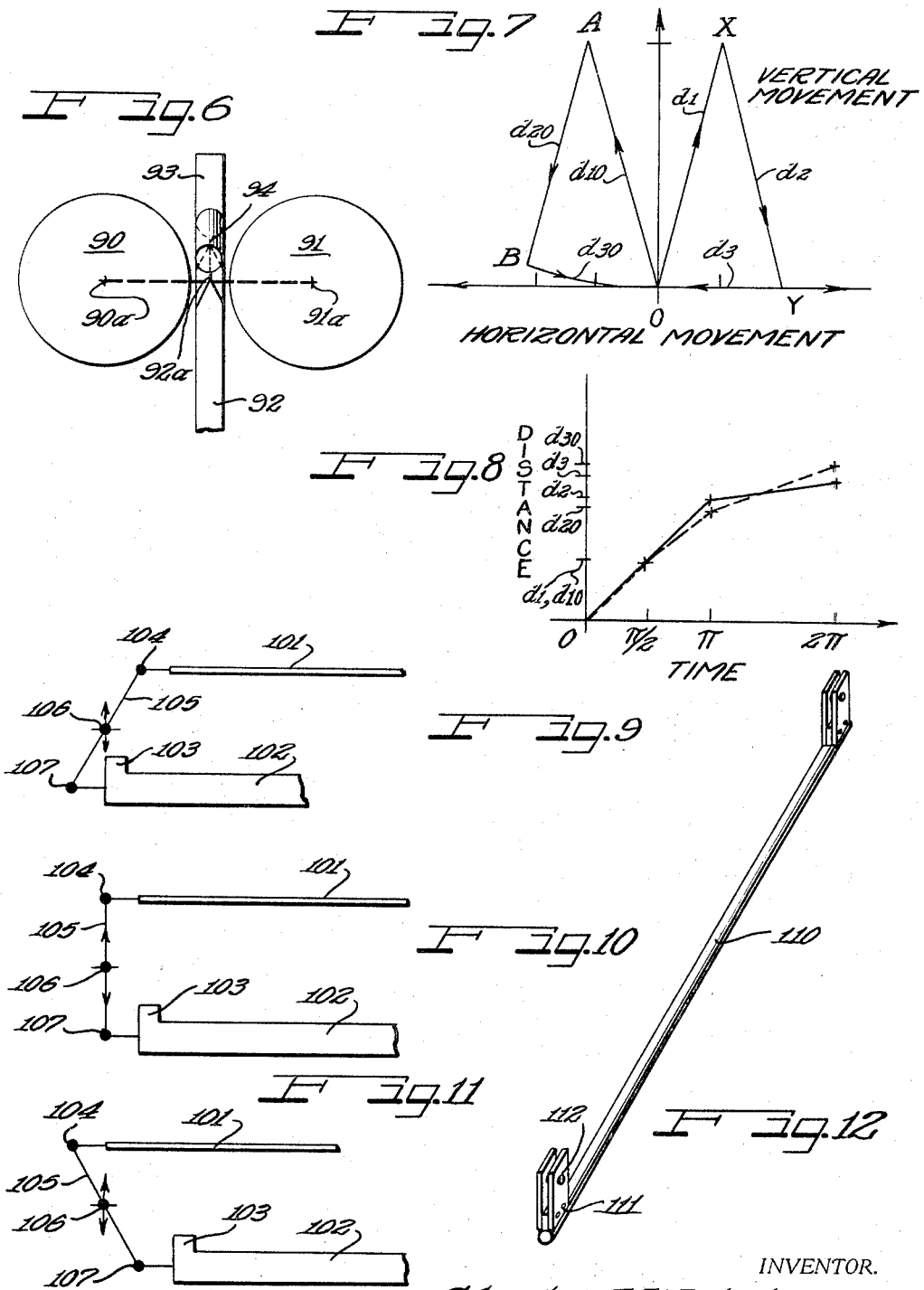

3,389,426
SHRIMP PROCESSING MACHINE
Clyde J. Welcker and Roland L. Welcker, both of 1334–36 St. Bernard Ave., New Orleans, La. 70116
Continuation-in-part of application Ser. No. 536,690, Mar. 23, 1966. This application Nov. 29, 1966, Ser. No. 597,737
11 Claims. (Cl. 17—2)

ABSTRACT OF THE DISCLOSURE

The present invention is directed to the concept of providing a method and apparatus for processing shrimp and like marine life wherein the outer shell and other inedible matter, including veins, are removed in a single operation by the cooperative effect of a pair of rollers, an undulating center plate and an opposingly undulating top impeller member. This abstract is intended only for the purpose of enabling the public to quickly determine from a cursory inspection the nature and gist of the present disclosure and the abstract shall not be used to limit or interpret the scope of the claims.

---

This is a continuation-in-part application of our copending application U.S. Ser. No. 536,690, filed Mar. 23, 1966.

In our Patent Nos. 3,080,605; 3,143,761; 3,143,763 and our aforesaid copending application Ser. No. 536,690, all of which are incorporated herein by reference, we have generally disclosed and claimed a shrimp processing machine and method which generally includes a pair of horizontal parallel side members having inclined or sloping surfaces extending downwardly toward each other. Such inclined or sloping surfaces are provided by members such as planar plates sloping towards each other or parallel rollers spaced apart to define a nip. Mounted in the space between the generally parallel members is a vertical plate having flat planar side surfaces facing each of the parallel members. The flat planar side surfaces provide opposing surfaces to the downwardly inclined surfaces of the parallel members to engage the outer covering of the marine life, such as shrimp, and remove it therefrom. In one embodiment of this machine, there is attached to the vertical plate, along its upper edge, at the receiving end of the processing machine, a feeder appendage which aids in propelling the shrimp down the channel formed by the parallel members. The parallel members are preferably rollers which rotate inwardly toward the centrally mounted plate. The center plate is provided with a unique undulating, or tilted D shaped motion in a vertical plane wherein the plate moves up and down in an arcuate path and is then returned along its horizontal path to its starting point. The horizontal movement is at a location generally recessed between the rollers so that the shrimp are, at that portion of the processing cycle, engaged by both rollers and the top edge of the vertical plate. These various movements between the cooperating members clean the shrimp and draw the inedible matter downwardly while simultaneously moving the shrimp horizontally along the channel formed by the rollers.

The present invention contemplates improvements in this type of processing machine whereby the shrimp and like marine life are peeled, squeezed, massaged and otherwise processed to remove inedible matter, including veins, to present fully cleaned edible meat.

Accordingly, it is an object of the present invention to provide an improved shrimp and like marine life cleaning method and apparatus which is capable of performing in one process the necessary cleaning operations at high rates of speed to yield fully cleaned meats ready for packaging and the like.

A further object of the present invention is to provide an improved shrimp cleaning machine having simplified movements for ease of operation allowing the shrimp to be automatically divested of its outer covering, and other inedible and/or objectionable matter, such as entrails, sand, grit, veins, appendages, etc., which are automatically pinched, squeezed, massaged and otherwise removed from the shrimp, presenting fully cleansed, ready to eat foodstuff.

A still further object of the present invention is to provide a machine capable of processing marine life to yield fully cleaned, ready to eat marine foodstuff by frictional pinching, squeezing, massaging and controlled slitting action accompanied by the cleansing and transporting of the marine life and which machine is relatively simple and inexpensive to manufacture, operate and maintain.

A still further object of the present invention is to provide a machine capable of handling all sizes of shrimp, sea prawn, crayfish and other like marine life, including sardines, simultaneously and without the necessity of independently sorting and grading the marine life into various size groups, thereby allowing greater economic advantages.

A still further object of the present invention is to provide a single machine capable of performing all the cleansing operations, including removal of the shell, outer appendages, sand, grit, entrails and veins in one pass, while avoiding meat mutilation and discoloration.

A feature of the machine of the present invention is the utilization of the inherent physical characteristics of the shrimp and like marine bodies and their outer coverings to the advantage of the cleansing process in order to effect a speedy, complete and uniform removal of the inedible and objectionable portions of the marine life. It has been noted that in the process of hand cleaning shrimp and like marine life, the fingers manually utilize pinching, pulling, unraveling, massaging, kneading, etc. operations. In the instant invention these and other desirable manual operations are utilized and substantially duplicated with the exploitation of frictional forces. These frictional forces and their reactions are utilized in beheading, peeling, removing exterior appendages, squeezing out entrails, massaging out major veins, sand, grit and generally finish-processing the shrimp and like marine life to present fully cleansed unmutilated meats.

It is to be noted that shrimp and like marine life generally have a heterogeneous structure including a body, a neck, a midsection, an end section and have an outer covering which is substantially different from the meat portion, and also have appendages, feelers, pinchers, legs, veins, entrails and the like. The various appendages normally attached to the body in one way or another possess certain elastomeric properties for flexibility but lack high synergistic response resiliency and/or are not securely attached to the body. Their cross-sections are small as compared with other parts of the marine life under consideration and all of these factors are taken advantage of by being easily engaged and removed by the cooperating machine components. The outer covering, such as the shell, is generally composed of relatively "rigid" material, that is stiff in comparison to the other parts and possesses limited elastomeric properties of flexiblity, with some synergistic response. The degree of resiliency is relatively slight and the elastic modulus is quite low so that it does not take too much force to overcome this resiliency. The outer covering, such as the shell, is also generally attached to the body by relatively flimsy tissue which is easily ruptured. The outer covering or shell also has a degree of roughness, nicks, barbs, sharp edges and the like, all of which increase the natural coefficiency of friction of the outer shell. The head shell is only slightly resilient due to its shape and composition so that the application of force easily flattens it. The inner soft mushy components add little or nothing to the resiliency of the shell structure and once flattened they remain squashed. The body meat is substantially different from the preceding components in that it has inherent inner elastomeric properties, and in addition to flexibility has inherent synergistic response to deformation and a higher elastic modulus making it more elastic. The surface of the body meat is smooth, moist and relatively hard and the addition of water tends to reduce the coefficient of friction of the body meat with the operative machine surfaces and increases the natural difference and values of the coefficient of friction of the smooth meat and the outer coverings. In the application of frictional forces in the processing of shrimp, the stresses produce strains including tension on neck gristle to cause separation, shear at the inner face of the outer coverings and body meats to cause loosening, shear in sliding the loosened outer covering from the body meats, compression of the head to cause squashing and removal, pinching and pulling of the various appendages, including the feelers, legs, tail flipper and so forth, massaging and controlled slitting of the meat to remove grit, sand, veins and other objectionable inner matter without mutilating the meat, and compression of the outer covering and the various appendages to force them into a space which does not accommodate the body meats.

The term "controlled slitting" as used in this disclosure indicates generally that a slight shear force is applied to the shrimp and like marine life bodies, but which force is generally insufficient to cause separation or parting of the normally solid or "hard" body meats. This slight shear force is sufficient, however, to cause separation of the body tissues surrounding veins and the like, thereby exposing them to the pinching and squeezing action of the machine components. In other words, the controlled slitting force applied to the shrimp is not transmitted through the shrimp bodies but only acts on the outer surface threof. As will be appreciated, shrimp and like marine life do not have extensive vein systems and generally have a "main vein" in the approximate center of the body meat close to the top surface thereof so that they are readily exposed for removal. The controlled slitting action by the center plate top edge in cooperation with the other operative components, including the top impeller member merely expose these veins so that they may be more readily removed by the other various co-operating machine components but which action does not mutilate the actual body meat.

Other objects, advantages and features of the invention will become more apparent with the teachings of the principles of the present invention in connection with the disclosure of the preferred embodiments thereof in the specification, claims and drawings in which:

FIGURE 1 is a diagrammatical partial view shown in perspective with parts broken away and the cover removed to better illustrate the working relationship between the various components of the processing machine;

FIGURE 2 is a partial perspective view of one embodiment of an adjustment means usable in the machine of the instant invention;

FIGURE 3 is a sectional view of the adjustment means taken substantially along the line III—III of FIGURE 2;

FIGURE 4 is a detailed perspective view of a portion of the upwardly extending planar member having an appendage attached at one end thereof and showing the top edge of the member as having a slope extending downwardly in a direction toward the discharge end;

FIGURE 5 is a partial diagrammatical view shown somewhat in perspective illustrating the motions and relative positions of the operative parts that directly engage the marine life;

FIGURE 6 is a diagrammatical end view of one set of rollers of the processing machine showing the relative positions of the upwardly extending plate and the top impeller member in relation to the rollers;

FIGURE 7 is a graph showing the simultaneous movement of the center plate and the impeller member in the horizontal and vertical direction;

FIGURE 8 is a graph plotting the total distance moved by the center member (in solid line) and impeller member (in dotted line) respectively versus time;

FIGURES 9 through 11 are simplified diagrammatical representations illustrating the relative movement of the upwardly extending plate and the top impeller member at various stages of their respective cyclic movements; and FIGURE 12 is a generally perspective view of the preferred embodiment of the top impeller member used in the procesing machine of the present invention.

As shown on the drawings:

As shown in FIGURE 1, a shrimp and like marine life processing machine, herein referred to as a processing machine, generally indicated at 10, has a receiving end 11 and a discharge end 12. At the receiving end 11 of the processing machine 10 there is provided a sloping receiving chute (not shown) for directing shrimp and like marine life to the processing rollers 13 and 13a, and forming a closure with the receiving ends of the processing rollers.

Processing rollers 13 and 13a are mounted for rotation by generally conventional means (shown in greater detail in the aforesaid parent cases) and have suitable power supply means (shown in greater detail in the aforesaid parent cases) rotating the rollers 13 and 13a relative to one another, preferably toward each other as indicated by the curved arrows. A set of processing rollers generally consists of two generally parallel horizontal rollers forming a continuous channel and the rollers are spaced apart a predetermined distance to form a working nip. The processing rollers 13 and 13a terminate at discharge end 12 of the machine 10 so that the cleansed marine life falls by gravity from the continuous channel down between the shafts or ends of the rollers to a suitable receiving means (not shown). A number of sets of processing rollers substantially identical to rollers 13 and 13a may be provided, depending primarily on the volume of the marine life to be processed. As shown in FIGURE 1, there is provided at least one set of processing rollers 13 and 13a, however, this is a partial and oversimplified view shown for clarity sake, and it has generally been found that a machine with about eleven sets of processing rollers provides sufficient capacity for most standard marine life processing and cleansing operations.

Each set of rollers is separated from the adjoining set of rollers by sloping shields or guide members (shown in greater detail in the aforesaid patent cases) for directing the marine life into the nip between a set of processing rollers. These guide members may be integrated with and suitably fastened to the receiving chute to provide a generally continuous surface area therewith. Each of the guide members has the general shape of an inverted V with one side of the guide member feeding marine life into the nip between one set of processing rollers and the other side of the guide member feeding into the nip between an adjacent set of processing rollers.

Upwardly extending member or center plate 14 extends upwardly between the processing rollers 13 and 13a so as to present its planar side surfaces in working relationship to the downwardly sloping surfaces of the respective processing rollers. The centerplate 14 is generally positioned in the substantial center of the nip formed between the rollers 13 and 13a and is at least coextensive with the rollers. Center plate 14 has a top working edge 14a and a feeding appendage 15, both of which aid in the processing of the shrimp and like marine life. Of course, one center plate 14 is provided for each set of processing rollers.

Rigidly attached to the center plate 14 are connecting members or rods 17, which in turn are rigidly attached to vertical hanger members 18. The hanger members 18, which may be in the form of common angle iron, are suitably rigidly attached to horizontal members 19. Directly connected to at least one of the horizontal members 19 is a horizontal drive means 20, which may be in the form of an air cylinder, having one end thereof rigidly attached to a horizontal member 19 and the other end rigidly attached to a stop means 20a which is rigidly supported by platform 26. While more than one drive means 20 may be provided for each of the horizontal members 19, it is generally sufficient to provide one drive means 20 and rigidly interconnect the horizontal members 19 by means of horizontal connecting shafts 21 so that horizontal members 19 move as a unit. Support members 22 have apertures of sufficient size (which are provided with bearing means, not shown) to freely pass horizontal connecting members 21 and at the same time guide members 21 in a straight line. Horizontal connecting members 21 also pass through the horizontal members 19 and are fastened on the outside thereof by attachment means 23. The movement of the horizontal members 19 are regulated by the stroke of the drive means 20 and by horizontal stop means 24, which are disposed on the outer sides of the respective horizontal members 19 to insure that the horizontal movement thereof does not exceed a preset maximum horizontal movement. A resilient bumper means 25 may be attached to the operative surface of the horizontal stop means 24 to reduce the noise of operation. The horizontal components and their related auxiliary components just described are all supported on a vertically moving platform 26.

Vertically moving platform 26 is suitably attached at its corner extremities on sleeves 27. On the interior of the sleeves 27 are suitably disposed bearing means (not shown) to allow the sleeves 27 to move vertically on fixed vertical shafts 28 which rest on the ground or other suitable support surfaces, such as a ship deck. An independent power means (not shown), somewhat similar to power means 20, is provided for the platform 26 to move it and all attached mechanisms up and down in a vertical direction. Suitably attached to the vertical moving platform 26 is a support plate 29. Plate 29 has slits 30 disposed at either end thereof and extends beyond the vertically moving platform 26 in the machine direction, but is not coextensive with the rollers 13 and 13a. Disposed above plate 29 is a horizontal arm 31 which has one end thereof attached to a horizontally moving member 19 and the other end pivotally attached at 32 to one end of a connecting linkage 33. The other end of the linkage 33 is pivotally attached at 34 to the upper end of a vertical connecting arm 35.

Vertical connecting arm 35 freely fits into slot 30 of plate 29 and moves in response to the movement of arm 31, which rests on the vertically moving platform 26 and is rigidly connected to the horizontally moving member 19. Attached to the underside of plate 29, at its extremities, are support members 36 spaced apart sufficiently to accommodate the vertical connecting arm 35. The support members 36 are pivotally connected at 37 with the vertically connecting arm 35 by means of pivot 38. Suitably attached to the pivot pin 38 is a retaining chain 39, having one end attached to the pivot pin 38 and the other end suitably anchored to plate 29. A number of adjustment holes 40 are provided on either side of pivot 37 in the body of the vertical connecting arm 35 to allow adjustment of the distance between the respective ends of the vertical connecting arm 35 and the pivot point 37.

The lower end of the vertical connecting arm 35 is pivotally attached at 42 with tabs or ears 42b rigidly connected to a top frictional impeller member 41. Adjustment holes 43 are provided in vertical connecting arm 35 to allow raising and lowering of the top impeller member as desired. A more detailed discussion of the top impeller member will be found hereinafter, especially in conjunction with FIGURE 12.

FIGURE 2 shows an alternative adjustment means 50 for regulating the spacing between the respective ends of vertical connecting arms 35 and its pivotal point 37. This same alternative adjustment means 50 may also be used to adjust the position of the impeller member 41. As shown in FIGURE 2, vertical connecting arm 35 is provided with a vertical slot 53, the inner wall of which are in the form of a toothed rack 54. The vertical connecting arm support members 36 are provided with a passageway (not shown) to accommodate a pinion 55 matching the toothed rack 54, which is in the form of a shoulder bolt to accommodate the pivoting action of the vertical connecting arm 35. One outer end of the pinion 55 has an adjustment head 56 to facilitate moving the pinion up and down the rack 54, while the other end has a suitable retaining means. A more detailed view of this adjustment means, taken substantially along line III—III of FIGURE 2, is shown in FIGURE 3 wherein similar parts have the same reference numerals. This type of adjustment arrangement allows quick and convenient adjustment by merely loosening retaining nut 58 and rotating adjustment head 56 up or down the toothed rack 54. As has been previously pointed out, this type of adjustment means may be used at pivot 37 or 42.

Turning now to a somewhat more detailed discussion of the operation of the shrimp processing machine 10 as shown in FIGURE 1, it will be noted that platform 26 (and all members attached thereto) moves up and down in a vertical direction as generally indicated by the vertical double headed arrow 26a, while horizontal members 19 (and all members attached thereo) move not only up and down in response to the movement of platform 26, but in addition move back and forth horizontally as indicated diagrammatically by the horizontal double headed arrow 19a. The substantially simultaneous horizontal and vertical motion thus obtained communicates a unique undulating cyclic motion to center plate 14, as diagrammatically indicated by a triangularly-shaped arrow line 14a. The same combination of horizontal and vertical motion gives a similar but substantially opposed undulating cycle to the frictional impeller member 41, as diagrammatically indicated by an opposing triangularly-shaped arrow line 41a. The separate horizontal and vertical motions are phased and programmed to give the resulting respective undulating motion to the center plate 14 and the top impeller member 41.

When the center plate 14 begins to move upwardly and forwardly in the direction of the discharge end 12 of the processing machine, in response to the substantially simultaneous upward movement of platform 26 and the forward movement of horizontal members 19, the top impeller member 41 substantially simultaneously moves upwardly and backwardly toward the direction of the receiving end 11 of the processing machine. The upward vector component is derived from the upward movement of platform 26 and the attached plate 29, while the backward vector component is derived from the forward horizontal movement of members 19 acting on vertical arm 35 at pivot 34, pushing this portion of the vertical arm 35 forwardly. Vertical arm 35 is restrained from moving horizontally forwardly by pivot pin 38 which secures vertical arm 35 to the horizontally immovable support members 36 and forces vertical arm 35 to pivot at this point, thereby imparting a backward motion to its lower end and the attached top impeller member 41. As the center plate 14 reaches its maximum vertical position and begins to move downwardly and forwardly in response to the substantially simultaneously downward movement of platform 26 and the continued forward movement of the horizontal members 19, the top impeller member 41 simultaneously reaches its maximum vertical position and begins to move downwardly and backwardly in the direction of the receiving end of the machine. The vector components of this portion of the processing cycle are derived from the substantially simultaneous downward movement of the platform 26 and the continued horizontal forward movement of the horizontal members 19. Finally, when the center plate 14 has reached its minimum vertical position and begins its return trip in the horizontal plane towards its initial position, in response to the backward motion of the horizontal members 19 while platform 26 remains at its lower position, the top impeller member 41 reaches its intermediate vertical position and begins to make an arc-like motion toward its initial position, such as to substantially converge toward the horizontal path of the center plate 14 so that this horizontal path assumes a substantially tangential relationship to the arc-like motion of the top impeller member. The arc-like motion of the top impeller member 41 results from the combination of its positional location and the backward movement of horizontal members 19, while platform 26 remains at its lower position. It will be noted that when the top impeller member 41 is at its intermediate vertical position it is also at its maximum horizontally backward position thereby being at a relatively greater vertical position than the center plate is at the corresponding portion of its cycle. The horizontal forward movement of the impeller member from this position causes it to assume the arc-like movement. Further detailed discussions of the processing cycles will be found hereinafter, especially in conjunction with FIGURES 5 and 7 through 11.

By varying the location of pivot point 37 in relation to the ends of the vertical connection arm 35, adjustment of the cyclic motion which the top impeller member 41 is driven through is achieved. Thus, if a greater distance is provided between the lower portion of the vertical connecting arm 35 and the pivot point 37, a greater horizontally returning arc-like motion will result. Adjustment of the pivot point 42 at the lower end of the vertical connecting arm 35 allows variations in clearance between the top working edge 14a of center plate 14 and the working face of the frictional impeller member 41. In one embodiment of the processing machine, a clearance in the range of 0.5 to 1.0 inch allows satisfactory results.

FIGURE 4 shows a detailed view of the center plate 70 having a feeder appendage 71 attached thereto. While various non-toxic and non-corrosive material may be used for center plate 70, a preferred embodiment is when the center plate and appendage are made of aluminum, however, certain rigid plastics having the requisite characteristics may also be used. The center plate 70 is generally linearly coextensive with the processing rollers 13 and 13a and has a height sufficient to allow its top working portion 72a to be generally equal to, or slightly above the plane containing the centers of the processing rollers at the beginning of its undulating cycle. This can be best visualized at FIGURE 6 wherein processing rollers 90 and 91 have center points 90a and 91a, respectively, which are joined by the dotted line, and the center plate 92 has a top portion 92a contacting the dotted line. The center plate 92 also has a feeder appendage 93 and in spaced relationship to the center plate 92 there is positioned a top impeller member 94. A preferred embodiment is where the receiving end of the top edge portion 72b of FIGURE 3 is somewhat above the nip line, while the discharge end of the top edge portion 72c is somewhat below the nip line, thus providing for a decreasing slope in the top edge portion of the center plate 70. As best seen in FIGURE 3, it will be noted that the upwardly extending member or center plate 70 is of a generally planar or rectangular shape having planar side surfaces converging to form a working edge or tapered top portion 72a which has a low point 72c and a high point 72b. The center plate 70 has a width 73 which is such as to be in relatively close running relationship with the downwardly converging surfaces of the processing rollers which define the working nip. In a preferred embodiment, the center plate 70 has a width 73 in the range of 0.0625 to 0.250 inch and is preferably 0.125 inch.

The center plate 70 has appendage 71 extending above and beyond the surface boundaries of the center plate 70. The width of the appendage 71 must be at least equal to the maximum horizontal stroke of the undulating cycle. In this regard, greater efficiency is obtained by having a channel closure at all times at the receiving end of the processing rollers. This prevents any marine life from sliding off, or being lost or damaged by the ends of the rollers, and allows the feeder appendage to propel the shrimp down the processing chute. The appendage 71 extends upwardly a distance 75, which is at least sufficient to effect a closure at the receiving end of the processing rollers in cooperation with the receiving chute, above the high point 72b of center plate 70. In the preferred embodiment of the invention, appendage 71 has a width 74 in the range of 0.5 to 3.0 inches which extends beyond the ends of the processing rollers, and a height 75 above the high point 72b of the center plate 70, in the range of 1.5 to 4.0 inches; preferably the width 74 of the appendage 71 is 1.5 inches and the height 75 is 3.0 inches.

FIGURE 5 shows a set of processing rollers 80 and 81 rotating toward each other, as indicated by the arrows and in a generally nip forming relationship. A center plate 82 is provided in the substantial center of the nip and has attached to it an appendage 83. The center plate 82 is moved in a unique oscillating vertical motion that is undulating in nature as shown by the arrow line 84, which defines generally a triangular-like shape, or a D tilted about 90°. In spaced relationship above center plate 82 and the processing rollers 80 and 81 and in substantially the center of the nip, there is provided a top impeller member 86. The top impeller member 86 is also moved in a unique oscillating vertical motion that is undulating in nature as shown by the arrow line 87, which is somewhat similar to the motion of the center plate 82 but is substantially opposed thereto.

Assuming point 84a to be the starting point of the center plate cycle and point 87a to be the starting point for the top impeller cycle, then as the center plate 82 moves upwardly and forwardly in an arcuate path to point 84b, the top impeller member 86 simultaneously moves upwardly and backwardly in an arcuate path to point 87b. The center plate 82 is next continuously moved downwardly and forwardly in an arcuate path from point 84b to point 84c, while simultaneously the top impeller member 86 is continuously moved downwardly and backwardly from point 87b to point 87c. The center plate 82 is then moved in a substantially horizontal path from point 84c to point 84a, while simultaneously the top impeller member 86 is moved in an arcuate path from point 87c to point 87a. In other words, the center plate and the top impeller member are moved in an undulating but opposing motion in a vertical plane and between each of the undulations, are moved generally horizontally back to their respective starting points. The undulating path of travel for these members transports the marine life along the channels formed by the processing rollers, as well as allowing cooperation between the downwardly sloping surfaces of the rollers and the planar side surfaces of the center plate for peeling the marine life, and further allows cooperation between the working edge of the center plate and the working face of the top impeller member to expose the vein in the marine life for subsequent removal by the pinching surfaces. While the foregoing recites the preferred motion of the center plate and top impeller member, an alternative cycle for these members would be a generally rectangular motion including movements straight upward, straight horizontally, straight downwardly, followed by horizontal return to the starting point.

The processing rollers of the instant invention are preferably provided with an elastomeric frictional outer surface, which is preferably composed of a polyvinyl chloride or PVC, as it is commonly referred to. This outer covering may be rigid or somewhat flexible, and is preferably somewhat flexible having a localized yieldable surface. Of course, it will be understood that other suitable non-toxic, water-proof resilient materials can be used to form the elastomeric outer frictional surface of the processing rollers. The PVC resins are preferred as they are very durable, easily processed, low in cost, have excellent water and chemical resistance and are relatively non-toxic. Further, PVC resins are usually compounded with a wide range of plastisols to obtain any desired degree of flexibility and strength.

The elastomeric outer surface of the processing rolls thus provided have exceptional frictional properties which are utilized in the cleansing and processing of the marine life. Further, such plasticized elastomer provides a substantially water-proof, non-toxic surface which is necessary in the handling of edible marine life. The soft, flexible and resilient outer surface provided by the elastomer covered processing rolls, cleans and processes all sizes of marine life, including the very small shrimp in the range of 125 to 150 count and the relatively larger shrimp up to and including shrimp as large as 15 count. A shrimp count may be generally defined as the number of particular sized shrimp that go into making up one pound. The flexible, soft outer surface of the processing rollers, having a relatively high coefficient of friction and localized yieldability, admits the marine life into more intimate contact with the processing surfaces as defined by a set of processing rolls, a center plate and a top impeller member. The cleaned marine meats are forced upwardly as slippage occurs when the outer covering of the marine life is removed; the slippage may be augmented by the addition of water which acts as a lubricant. Water jets (not shown) are positioned above the cleaning nips to supply water to the operative surfaces of the processing machine and the shrimp bodies to act as a lubricant therebetween and aid in cleaning and washing trash downwardly. The localized yieldable surface of the processing rolls allows the relatively hard heads and skins of the marine life to be drawn down to the trash level. Sardines and other like small fish that are generally included in shrimp catches are also cleaned. The fish are skinned and their entrails are squeezed out of their mouths, leaving the fish ready for cooking or other desirable processing.

Each processing roll may also be provided with a surface pattern to increase the frictional properties of the outer peripheral surface thereof. Various patterns, such as shown in the aforesaid pending application, are useful in providing this additional friction, and in the preferred embodiment, relatively fine helically spiraled grooves and ridges are provided over the entire length of the processing roll and superimposed thereon is another set of helical grooves and ridges which are relatively more distinct than the first set of grooves and ridges and are in a relatively coarser spiral configuration. This unique configuration tends to act as a conveying mechanism for the marine life in the channels formed by two such opposing spiral surface rollers, and additionally in cooperation with the center plate and the top impeller member, tends to massage and knead the marine life in the nip. It is to be noted that when the center plate is moving in a horizontal backward direction, i.e., toward the receiving end of the processing machine, its working edge is somewhat above the nip line and thus tends to carry the marine life in the nip backward during the horizontal return stroke of the undulating cycle, substantially against the frictional surface of the processing rolls. This type of backward motion of the marine life allows a more complete removal of any still adhering appendages. However, it must be controlled as unrestrained backward movement of the marine life would tend to prolong the contact between the relatively delicate meat surfaces and the relatively tough processing surfaces which would tend to mutilate or discolor the meat. The top impeller member substantially tends to counteract this backward frictional drag of the shrimp while still allowing complete removal of the appendages. A careful study of the cyclic motions of the impeller member and the center plate clearly shows that when the center plate is moving horizontally backwardly, the top impeller member is moving horizontally forwardly in substantially opposing direction to the movement of the center plate. Since the horizontal movement of the top impeller member is somewhat greater than the horizontal backward movement of the center plate, the overall result in force is in the forward direction, further propelling the shrimp and like marine life down the processing channel. Further, the top impeller member cooperates with the top edge of the center plate to achieve controlled slitting of the shrimp body to expose the veins thereof so that they may be removed by the frictional surfaces of the processing machine.

Referring now to FIGURE 7, the graphs plotting the relative vertical movement of the center plate and the top impeller member against the respective horizontal movement thereof is shown. Thus, the graph at the right of the central axis shows the cyclic movement of the center plate while the graph at the left of the center axis shows the cyclic movement of the top impeller member. Thus, while the center plate is moving from point O to point X at a distance of $d_1$, the top impeller member is moving from O to point A a distance of $d_{10}$. Points A and X are relatively equal so that the distances $d_1$ and $d_{10}$ are also equal. Referring back to the graphs of FIGURE 7, as the center plate moves from point X to point Y a distance $d_2$, the impeller member moves from point A to point B a distance of $d_{20}$. As is readily apparent, $d_2$ is not equal to $d_{20}$ as the distance between points A and B is somewhat less than the distance between points X and Y. After the center plate has reached point Y it begins to move toward point O for a distance of $d_3$. Substantially simultaneously the top impeller member moves from point B to point O for a distance of $d_{30}$ substantially along the arcuate path shown in the graph. This type of cyclic opposing motion of the top impeller member and the center plate allows the relative spacing between the top edge of the center plate and the working face of the top impeller member to remain substantially constant during the upward and downward portion of the cycle, but allows the horizontal motions to be substantially opposed thereby imparting a slight overall forward component on the shrimp being processed.

FIGURE 8 shows a graph plotting the total distance moved by the impeller member and the center plate versus time. The distance moved by the impeller member is shown in dotted line, while the distance moved by the center plate is shown in solid line. As is readily apparent, the cycle of motion can be regulated either in a horizontal stroke or a vertical stroke independently by appropriate regulation of the drive means. One distinction between the movement of the top impeller member and the center plate, of course, involves a comparatively greater forward (horizontal) movement of the top impeller member, i.e., arc $d_{30}$ of FIGURE 7 or the distance of the dotted line from $d_{20}$ to $d_{30}$ of FIGURE 8 as compared to contemporaneous backward center plate movement depicted as line $d_3$ of FIGURE 7 or solid line distance from $d_2$ to $d_3$ of FIGURE 8 (shown in relation to the "cyclic" time representation for both these movements, viz., $\pi$ to $2\pi$ in FIGURE 8). In the preferred embodiment of the processing machine, the vertical stroke of the top impeller member and the center plate member, as shown in FIGURE 7, is regulated so as to be in the range of 1 to 3 inches, and is preferably 2 inches. The horizontal stroke of the center plate is regulated so as to be in the range of 0.25 to 1.5 inches, and is preferably 0.875 inch, while the horizontal stroke of the top impeller member is in the range of 0.50 to 2.0 inches, and is preferably 1.125 inches. In the preferred embodiment of the invention, the cyclic motion of the center plate and the impeller member is completed within 1.125 to 4.5 seconds, and preferably the cycle is completed in 2.25 seconds. It will be noted that the time required for the vertical stroke to reach its maximum point is approximately one-half the time required for the horizontal stroke to reach its maximum point.

FIGURES 9 through 11 illustrate, in overly simplified form, the relative horizontal positions of the top impeller member 101 and the center plate 102. FIGURE 9 shows the relative position of the top impeller member 101 in respect to the center plate 102 at the beginning of the cycle, i.e., at point O, as shown in FIGURE 7. The center plate 102 is provided with a feeder appendage 103. Pivotal point 104, connecting the pressure impeller member 101 to the connecting arm 106, is substantially similar to pivotal point 42 of FIGURE 1. Pivotal point 105, which is movable only in a vertical direction, as generally indicated by the double headed arrow, is substantially similar to pivotal point 37 of FIGURE 1 and pivotal point 107 is substantially identical, at least in function, to pivotal point 34 of FIGURE 1. FIGURE 10 illustrates the relative position of the top impeller member 101 and the center plate 102 when these members are at their maximum vertical positions. FIGURE 11 illustrates the relative positions of the impeller member and the center plate when the center plate is at its minimum vertical position, i.e., point Y of FIGURE 7 and the top impeller member is at its intermediate vertical position, i.e., point B of FIGURE 7, just prior to these respective members moving to the starting position as shown in FIGURE 9.

Referring now to FIGURE 12, wherein a perspective view of the top impeller member 110 is shown. Generally, the impeller member 110 should be about 50% to about 100% of the length of the processing rolls, and in the preferred embodiment, the top impeller member 110 is generally 75% of the length of the processing rolls. Top impeller member 110 should be spaced inwardly from the receiving end of the processing rolls about 10% to 20% of the overall length of the processing rolls and may in addition be somewhat spaced from the discharge end of the processing rolls. The spacing of the top impeller member in respect to the receiving end of the processing rolls facilitates the orderly movement with shell removal from the shrimp and like marine life while the spacing at the discharge end of the processing rolls allows the cleansed shrimp and other like marine life to be discharged at the discharge ends of the processing rolls without undergoing as severe a processing. The main body of the top impeller member 110 is either composed of, or covered with a resilient flexible material. This material may be plasticized plastic, rubber, or any other similarly appropriate synthetic plastic. It will be noted that top impeller member 110 is generally in the shape of a cylindrical rod and preferably has an outside diameter in the range of 0.125 to 0.625 inch. At either end of the body of the top impeller member 110 there is provided attachment plates 111 which are secured to the main body and extend upwardly for suitable attachment through apertures 112 to the remainder of the processing machine as explained in conjunction with FIGURE 1.

In summary, it will be seen that there is provided an improved shrimp and like marine life processing method and machine which is capable, because of its unique features, of removing the outer shell, various attached appendages, veins, entrails, sand, grit, etc. in a single pass so as to present fully cleaned unmutilated meats. The processing machine embodies unique cooperation between the various components thereof to achieve this result. The processing machine is provided with processing rolls having water-proof, non-toxic, frictional solid elastomeric operating surfaces with localized yieldable areas. The natural frictional properties of these rolls may be augmented by providing circumferentially transverse or longitudinal scoring of the outer periphery thereof so as to provide additional contact areas and edges to assist in the processing of the marine life and to aid in propelling the marine life down the length of the rollers to the discharge end thereof. The processing machine also utilizes a unique center plate having a tapered top portion or work edge with a decreasing slope extending toward the discharge end of the machine. The center plate and its unique configuration jostles and otherwise moves the marine life within the processing channels exposing every portion of the marine life to the squeezing, peeling, massaging, etc. action of the processing machine as the center plate is being driven through its undulating cycle. Attached to the receiving end of the center plate is a feeder appendage which forms a closure with the receiving chute to present a receiving end having a generally continuous surface. The feeder appendage aids in moving the marine life from the receiving chute down to the processing channels and aids in propelling the marine life down the processing channels. In spaced working relationship, generally above the processing rolls and in register with the center plate, a top impeller member is positioned and so connected to the center plate as to move in substantially opposing relationship in response to the movement of the center plate. The top impeller member propels the marine life forwardly in the processing channel in opposition to the backward horizontal movement of the center plate (which is made during a portion of its undulating cycle). The cooperation between the top working edge of the center plate and the top impeller member results in a controlled slitting action exposing veins in the marine life for the removal thereof by the processing machine. The processing method and machine of the invention provide unique cooperation of the operative elements to result in fully cleaned, ready to eat meats, and yet the machine is easy to operate and maintain and is economical to manufacture.

It will be understood that modifications and variations may be effected without departing from the spirit and scope of the novel concepts of the present invention.

We claim as our invention:

1. A machine for cleaning shrimp and like marine life comprising at least a pair of generally parallel roller members mounted for rotation and having inwardly and downwardly sloping frictional surfaces defining a nip therebetween, a first drive means rotating said roller members relative to each other, a movable center plate member positioned in said nip having vertical side surfaces facing said sloping surfaces, a top impeller member in spaced working relationship above said center plate member and movable therewith and, a second drive means for moving the center plate member through an undulating vertical cycle relative to said roller members while substantially simultaneously moving said top impeller member through a substantially opposing undulating cycle relative to said center plate cycle.

2. A machine according to claim 1 wherein the overall resultant force vector from the opposing cycles of the center plate member and the top impeller member is toward the forward direction of said machine.

3. A machine according to claim 1 including a plurality of water supply means positioned adjacent the top impeller member for supplying water to the surface of the top impeller member, the roller members and the center plate thereby lubricating and washing the same.

4. A machine according to claim 1 wherein the vertically undulating cycle of the center plate is generally triangularly shaped, moving first upwardly and forwardly moving the marine life in the nip, next downwardly and forwardly applying peeling and squeezing pressure to the marine life in the nip and then horizontally backwardly massaging the marine life in the nip and the opposing undulating cycle of the top impeller member is generally triangularly shaped, moving first upwardly and backwardly, then downwardly and backwardly, then horizontally forwardly overcoming the backward motion of the marine life in the nip.

5. A machine according to claim 1 wherein the center plate member is generally laterally coextensive with the roller members and is provided with a tapered top working edge having a decreasing slope extending in a forward direction with a high point at the receiving end of said machine.

6. A machine according to claim 5 wherein the tapered top working edge cooperates with the top impeller member to controllably slit the marine life in the nip thereby exposing veins for removal.

7. A machine according to claim 5 wherein a feeder appendage is attached to the center plate at its high point, said feeder appendage extending beyond the receiving end of the processing rollers for a distance at least equal to the horizontal movement of said center plate and above the horizontal plane containing the nip a distance at least sufficient to effect a closure at the receiving end of the machine.

8. A machine according to claim 1 wherein the frictional surfaces of the processing rollers are composed of a non-toxic water-proof solid elastomer.

9. A machine according to claim 8 wherein the elastomeric surfaces of the processing rollers are provided with scored peripheral patterns thereby providing contacting edges for the marine life in the nip.

10. A machine according to claim 1 wherein the top impeller member extends a length equal to at least 50% of the processing rollers length.

11. A machine for processing shrimp and like marine life comprising, a vertically movable platform supported on a surface, a first drive means connected to said movable platform driving said platform in a reciprocating up and down movement, a horizontally movable member supported on said platform, a second drive means connected to said horizontally movable member driving said horizontally movable member in a reciprocating back and forth movement, a pair of processing rollers having downwardly and inwardly sloping frictional surfaces mounted for rotation and in spaced relation to said platform, said processing rollers being in general parallel relationship to each other and spaced apart to define a nip, a third drive means for rotating said rollers relative to each other, a movable center plate member laterally coextensive with said processing rollers and positioned in the substantial center of said nip, said center plate having a tapered top working edge extending in a forward direction and having planar side surfaces, a feeder appendage attached to said center plate at one end thereof, said feeder appendage extending above and beyond the periphery of said center plate, a first means connecting said horizontally movable member to said center plate, a movable top impeller member in spaced working relationship positioned above said center plate in register therewith and, a second means interconnecting said top impeller member with said horizontally movable member and said vertically movable platform whereby the center plate is driven through an undulating vertical cycle, first forwardly and upwardly, next forwardly and downwardly and then horizontally backwardly and substantially simultaneously the top impeller member is driven through a substantially opposing undulating cycle having a relatively greater horizontal forward movement than the horizontal backward movement of the center plate.

References Cited

UNITED STATES PATENTS

| | | | |
|---|---|---|---|
| 2,537,355 | 1/1951 | Lapeyre et al. | 17—2 |
| 2,778,055 | 1/1957 | Lapeyre et al. | 17—2 |
| 2,832,092 | 4/1958 | Lapeyre et al. | 17—2 |
| 2,886,844 | 5/1959 | Lapeyre et al. | 17—2 |
| 2,976,564 | 3/1961 | Skrmetta | 17—2 |
| 2,988,771 | 6/1961 | Lapeyre et al. | 17—2 |
| 3,018,510 | 1/1962 | Lapeyre et al. | 17—2 |
| 3,070,832 | 1/1963 | Lapeyre et al. | 17—2 |
| 3,070,833 | 1/1963 | Skrmetta | 17—45 |
| 3,080,605 | 3/1963 | Welcker et al. | 17—2 |
| 3,143,761 | 8/1964 | Welcker et al. | 17—2 |
| 3,143,763 | 8/1964 | Welcker et al. | 17—45 |
| 3,203,034 | 8/1965 | Matzer et al. | 17—2 |

LUCIE H. LAUDENSLAGER, *Primary Examiner.*